Figure 1:
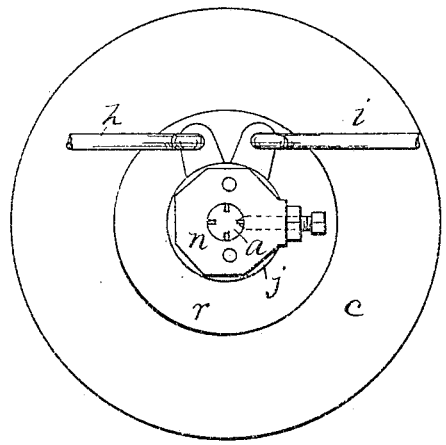

No. 787,072. PATENTED APR. 11, 1905.
A. P. BRUSH.
FRICTION CLUTCH.
APPLICATION FILED FEB. 19, 1904.

Witnesses:
O. B. Barnziger
James F. Hill

Alanson P. Brush
Inventor
By his Attorney Newell S. Wright

No. 787,072. Patented April 11, 1905.

UNITED STATES PATENT OFFICE.

ALANSON P. BRUSH, OF DETROIT, MICHIGAN.

FRICTION-CLUTCH.

SPECIFICATION forming part of Letters Patent No. 787,072, dated April 11, 1905.

Application filed February 19, 1904. Serial No. 194,426.

*To all whom it may concern:*

Be it known that I, ALANSON P. BRUSH, a citizen of the United States, residing at Detroit, county of Wayne, State of Michigan, have invented a certain new and useful Improvement in Friction-Clutches, of which the following is a specification, reference being had to the accompanying drawings, which form a part of this specification.

My invention has for its object certain new and useful improvements in a friction-clutch, the same being more especially designed and adapted for use in connection with a transmission-gear for power-propelled vehicles; but I do not limit myself solely thereto, as my invention contemplates as coming within its scope any and all uses for which the same may be found adapted.

I carry out my invention as follows:

In the drawings, $a$ represents a power-shaft driven by any suitable source of power, and $b$ is a driven member sleeved upon said shaft. A friction-plate is indicated at $c$, the same being constructed with a hub $d$, keyed upon said shaft, as indicated at $e$, said friction-plate being arranged to be forced against the member $b$. To force the friction-plate $c$ against the member $b$, I have shown two toothed rings or disks $f$ and $g$, having interlocking teeth on their adjacent surfaces, the teeth being beveled or wedge-shaped on their adjacent faces, as shown, said disks or rings being provided with operating-levers $h$ and $i$, whereby each of said disks may be operated the one independently of the other. A thrust-collar is indicated at $j$ outside the ring $f$, the ring $g$ having also a thrust-bearing against a shoulder $k$ of the hub $d$. The disks $f$ and $g$ are provided with ball-bearings, (indicated at $l$ and $m$,) the ball-bearings $l$ contacting with the thrust-collar $j$ and the adjacent portion of the hub $d$, while the ball-bearings $m$ contact with the hub $d$ and the shoulder $k$. The disks and the thrust-collar $j$ are held in position on the shaft by means of a nut $n$. Within the hub is located a spring $p$ to hold the friction-plate normally away from the plate $b$. It will be apparent that when the friction-plate is forced against the member $b$ the member $b$ is made to revolve with the shaft $a$. The disks $f$ $g$ are actuated by their respective levers $h$ and $i$. By a proper movement of one of said levers the friction-plate is forced against the member $b$. The friction-plate is released from the member $b$ by a corresponding reverse movement of one of the said levers. Any suitable frictional contact-surface intermediate the plate $c$ and member $b$ is indicated at $q$. It will be understood that any desired mechanism to be driven by the clutch may be carried by the member $b$.

It will be evident that the rings $f$ and $g$ are entirely supported upon the balls, the balls with the ring and collar forming antifriction and thrust bearings upon the hub of the plate. It will also be seen that when the rings are moved one with respect to the other they will be moved apart to force the friction-plate upon the member $b$.

It will be seen that the same set of balls aid not only in forming a thrust-bearing, but also a center bearing with respect to the shaft—*i. e.,* the same balls that take the thrust support and maintain the rings upon the shaft. The toothed rings do not contact with any of the rotating parts of the mechanism except through the balls in any direction. I prefer to construct the friction-plate $c$ and its hub in two parts, the hub being provided with a flange $r$, which may be bolted to the plate $c$, the plate $c$ projecting outwardly beyond said flange and being preferably somewhat elastic.

Figure 2:
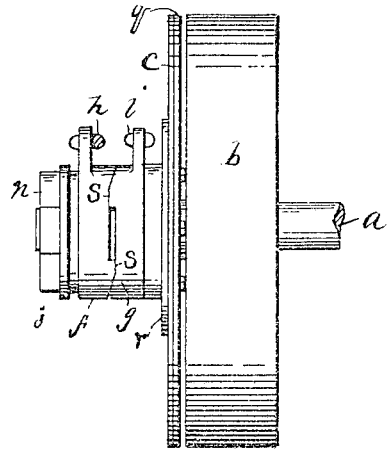
Figure 3:
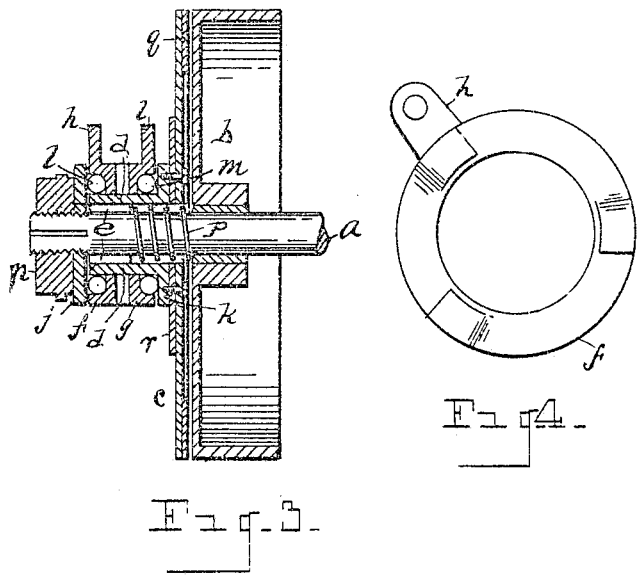
Figures 4, 5:
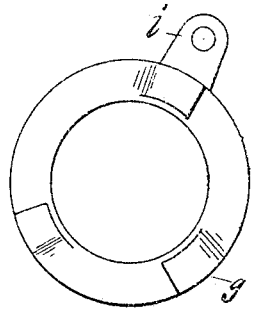

The cam-surfaces on the rings $f$ and $g$ between the teeth preferably are so arranged that when the teeth pass a certain point the rings will be maintained for a given period in such position. This is accomplished by constructing the rings between the teeth with parallel surfaces, as indicated in Fig. 2 at $s$. After the rings pass the highest point of their teeth there will be no further motion and no tendency to release until the rings are again actuated.

What I claim as my invention is—

1. A friction-clutch comprising a rotatable shaft, a driven member sleeved upon the shaft, a friction-plate to engage the driven member rotatable with the shaft having an extended hub provided with a shoulder adjacent to the plate and in a plane parallel to said plate, inner and outer disks having interlocking wedge-shaped teeth on their adjacent faces both mounted upon the extended hub of the friction-plate, a thrust-collar adjacent to the outer disk to hold the disks in place upon the shaft, means to rotate each of said disks independently the one of the other to force the friction-plate upon the driven member, and a set of ball-bearings for each of said disks, one set of ball-bearings supporting the inner disk and serving as a thrust-bearing against said shoulder, and the other set of ball-bearings supporting the outer disk and serving as a thrust-bearing against said collar.

2. A friction-clutch comprising a rotatable shaft, a driven member loosely mounted thereupon, a friction-plate provided with an extended hub rotatable with the shaft to engage the driven member, adjacent inner and outer disks having adjacent cam-surfaces both mounted upon the extended hub of the friction-plate, means to hold the disks in place, a set of ball-bearings entirely supporting each of said disks upon the hub, said ball-bearings also forming a thrust-bearing in both directions longitudinally of the shaft and a central bearing toward the axis of the shaft.

3. A friction-clutch comprising a rotatable shaft, a driving member sleeved thereupon, a friction-plate provided with a hub rotatable with the shaft, toothed disks having interlocking wedge-shaped teeth on their adjacent faces both mounted upon said hub, means to hold the disks in place, means to rotate said disks to force the friction-plates upon the driving member, said disks mounted upon ball-bearings, and a spring to exert its tension against the friction-plate.

4. A friction-clutch comprising a rotatable shaft, a driven member sleeved thereupon, a friction-plate provided with an extended hub mounted on said shaft and rotatable therewith to engage the driven member, adjacent inner and outer disks having interlocking teeth provided with coacting cam-faces on their adjacent sides both mounted upon the extended hub of the friction-plate, means to hold the disks in place upon the shaft, means to rotate said disks to force the friction-plate upon the driven member, and ball-bearings for each of said disks, said disks constructed to form both central and endwise bearing surfaces for the balls, said ball-bearings forming a thrust-bearing in both directions longitudinally of the shaft and central supporting-bearings toward the axis of the shaft.

5. A friction-clutch comprising a rotatable shaft, a driven member sleeved thereupon, a friction-plate provided with an extended hub mounted upon said shaft and rotatable therewith to engage the driven member, adjacent inner and outer disks having interlocking teeth provided with coacting cam-faces on their adjacent sides mounted upon the extended hub of the friction-plate, a thrust-collar upon the shaft adjacent to the outer disk to hold the disks in place, means to rotate said disks to force the friction-plate upon the driven member, and ball-bearings for each of said disks, said disks constructed with cup-shaped seats for the bearings to form both central and endwise bearings for the balls, said ball-bearings forming a thrust-bearing in both directions longitudinally of the shaft and central supporting-bearings toward the axis of the shaft.

6. A friction-clutch comprising a rotatable shaft, a driven member sleeved thereupon, a friction-plate provided with an extended hub mounted upon the shaft and rotatable therewith to engage the driven member, adjacent inner and outer disks having interlocking teeth provided with coacting cam-faces on their adjacent sides mounted upon the extended hub of the friction-plate, means to hold the disks in place, means to rotate said disks to force the friction-plate upon the driven member, and a row of balls to form the bearings of each of said disks, said disks forming a central and endwise bearing for the corresponding single row of balls, said ball-bearings forming a thrust-bearing in both directions longitudinally of the shaft and central supporting-bearings toward the axis of the shaft.

In testimony whereof I have signed this specification in the presence of two subscribing witnesses.

ALANSON P. BRUSH.

Witnesses:
 N. S. WRIGHT,
 M. L. SIMMONS.